Feb. 7, 1928. 1,658,158
O. DREYER
DEVICE FOR AUTOMATICALLY DISCONNECTING ELECTRIC CIRCUITS
Filed July 4, 1925 4 Sheets-Sheet 1
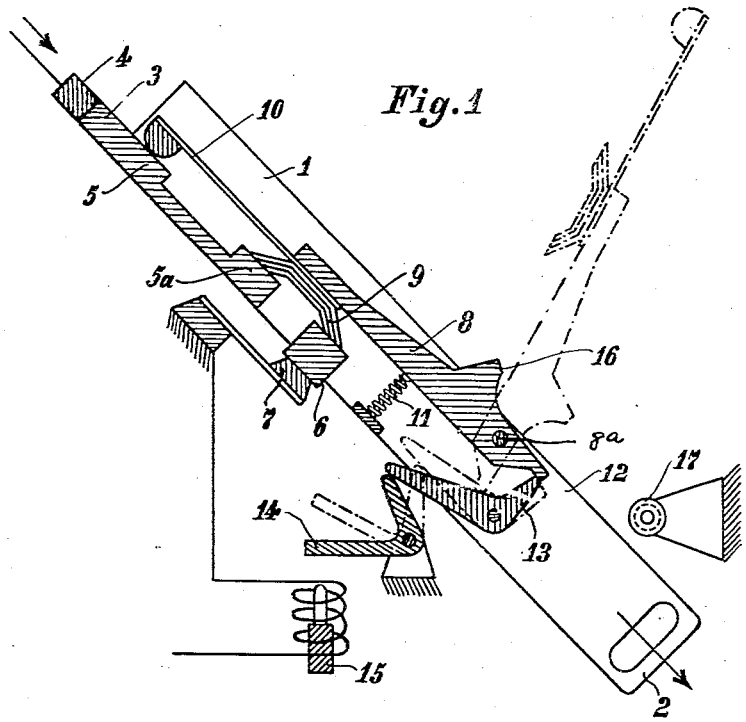
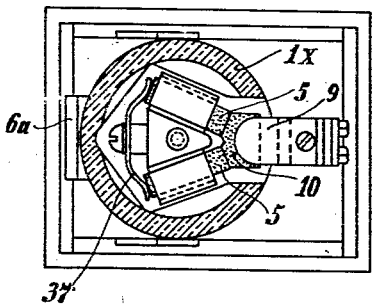
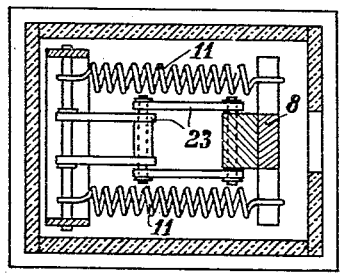
INVENTOR:
Otto Dreyer
BY
ATTORNEY.

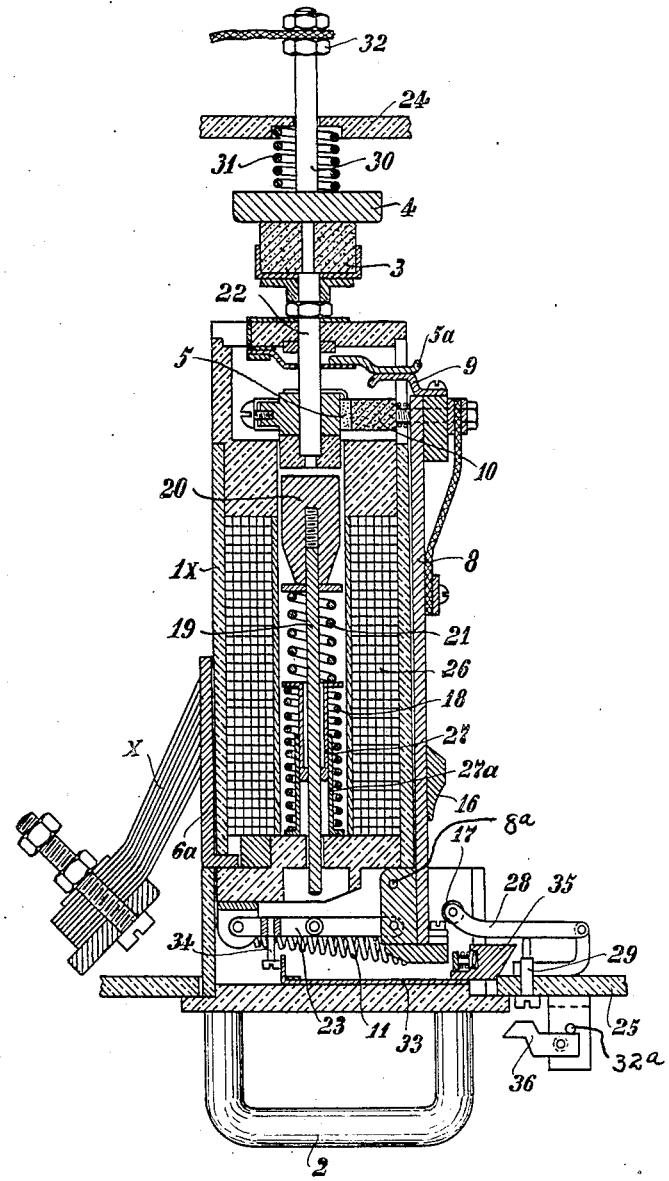

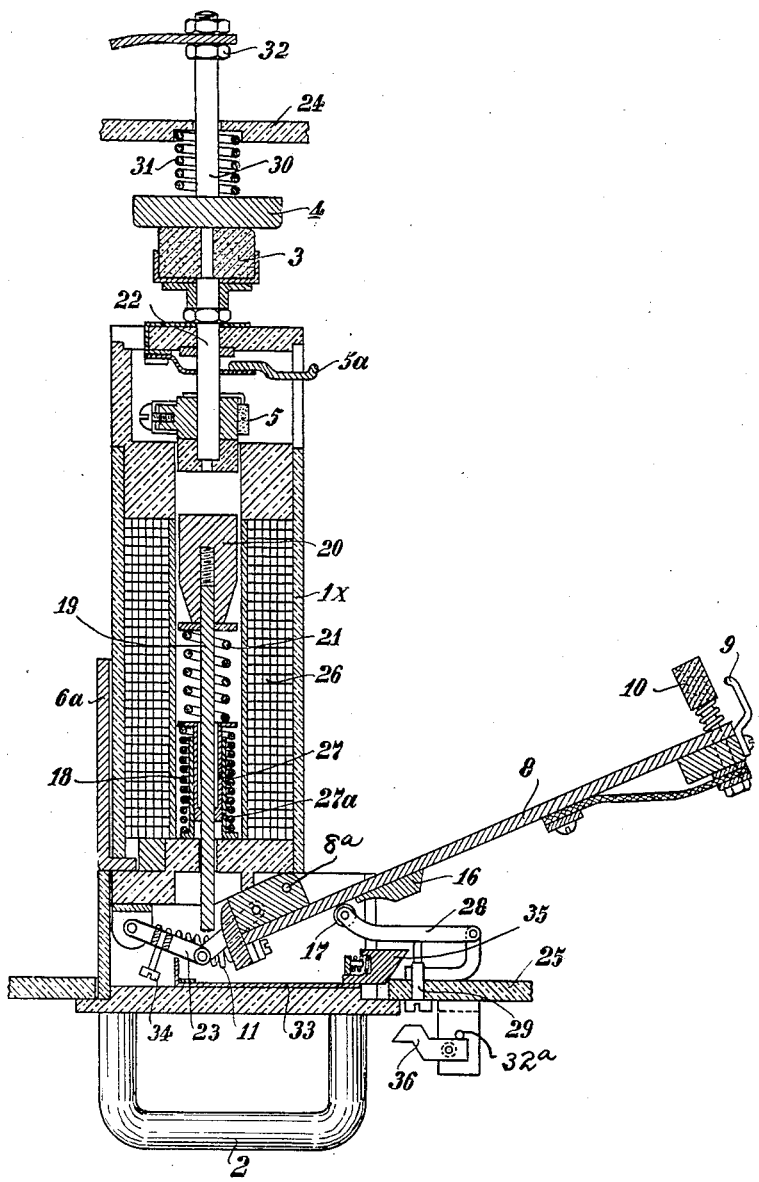

Feb. 7, 1928. 1,658,158
O. DREYER
DEVICE FOR AUTOMATICALLY DISCONNECTING ELECTRIC CIRCUITS
Filed July 4, 1925 4 Sheets-Sheet 4
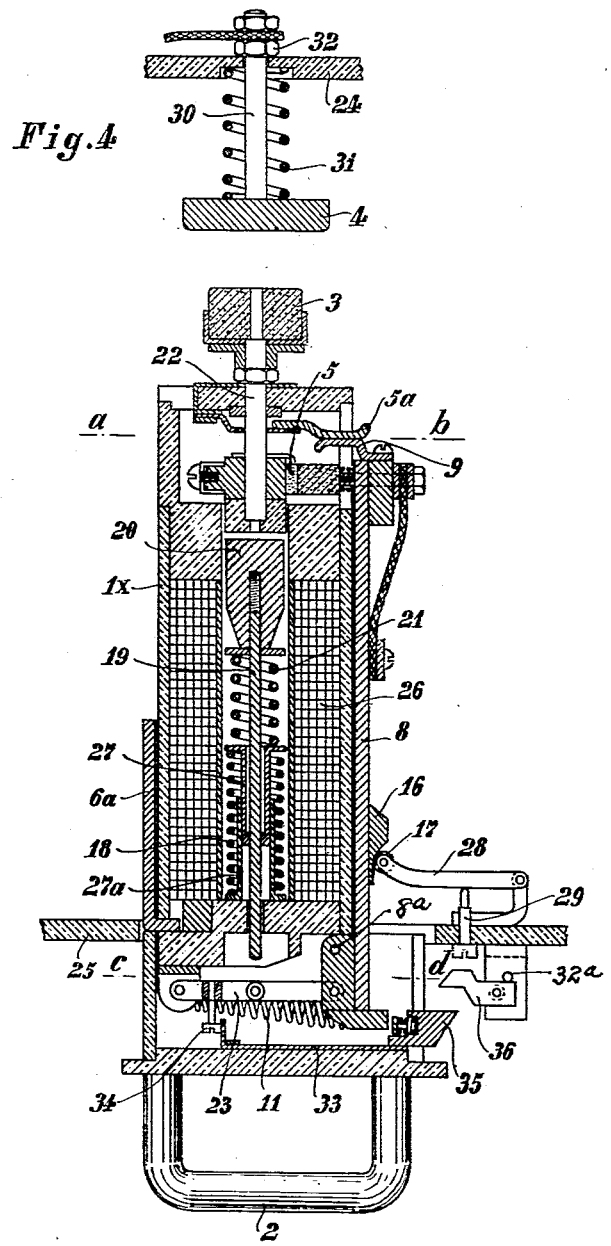
INVENTOR
Otto Dreyer
BY
ATTORNEY.

Patented Feb. 7, 1928.

1,658,158

UNITED STATES PATENT OFFICE.

OTTO DREYER, OF ESSEN-ON-THE-RUHR, GERMANY.

DEVICE FOR AUTOMATICALLY DISCONNECTING ELECTRIC CIRCUITS.

Application filed July 4, 1925, Serial No. 41,455, and in Germany July 5, 1924.

The invention relates to a device for automatically disconnecting electric circuits endangered by overload from a supply circuit, in which device a hand operated switch and an automatic cut-out switch in series therewith are so united together that the automatic switch is independent of the hand operated switch in its opening movement, while after being opened it is adapted to be reclosed by opening the hand operated switch. The novelty consists primarily in the automatic switch, which is advantageously formed as a lever-switch, being arranged on the movable part of the hand operated switch, the reclosing of the automatic switch being effected by means of a stop or striker provided on the switch-frame or the like against which the hand operated switch moves when opened. The movable part of the hand operated switch is preferably formed as a slide guided so as to be able to reciprocate, which slide, if desired, after release of a part limiting its opening movement, can be withdrawn, together with the automatic switch, completely out of its guide. In consequence of this construction, in the first place, the space occupied by the device, even when made for very large currents and voltages, is comparatively small, and in fact the device does not take up materially more space than an ordinary lever-switch for the same current and voltage. Further, there is the additional special advantage that the hand operated switch, together with the automatic switch, may be mounted in a plane transversely to the plane of the switchboard, so that the device takes up a minimum amount of space vertically and horizontally on the switchboard. By means of the invention the additional feature is obtained that all the contacts of the automatic switch are dead when the hand operated switch is open, so that they can be inspected and put in order or be exchanged without it being necessary to open the primary or cut-out switch connected in the main circuit, which as a rule involves the disconnection from the main circuit of all other circuits supplied with current therefrom. Moreover the means permitting adjustment and exchangeability both of the contacts of the automatic switch, and also of the movable contacts of the hand operated switch, are very materially simplified and facilitated by the movable part of the hand operated switch being adapted for complete removal from the remainder of the device by means of a few releasing movements of the hand. Consequently the possibility is at the same time also afforded in urgent cases of quickly substituting for the movable member of the hand operated switch and the automatic switch in use equivalent new parts or other like parts of higher or lower potential controlling value. Finally, the provision of a novel cut-out on the hand operated switch renders it possible for both switches to open so widely that the continuance of an arc is avoided with certainty.

The automatic switch may be influenced by an excess current releasing device operating at any predetermined current strength, or by thermal or a similar releasing device, and said releasing device may, if desired, be arranged on the switch-frame. When it is of importance for the device to occupy a small amount of space, the releasing device may be mounted on or in a movable part of the switch, as, for example, in the slide of the hand operated switch, made of tubular form in that case.

By the arrangement of the automatic cut-out switch on the movable part of the hand operated switch the possibility is moreover afforded, when voluntarily switching off by hand, of utilizing the automatic switch for instantaneously breaking the circuit. For this purpose one of the contacts of the hand operated switch may be displaceable in the direction of opening movement of said switch and be so subjected to the action of a spring, which presses it against a coacting contact, that the mutual separation of the contacts of the hand operated switch does not take place until after the switch has completed a portion of its opening movement, while an additional mechanical releasing device for the locking device of the automatic switch is so arranged that the automatic switch is released during such opening movement of the hand operated switch before the contacts of the hand operated switch separate from one another.

Two embodiments of the present invention are illustrated by way of example in the accompanying drawings, in which:—

Fig. 1 is a longitudinal section of the first example which is particularly simple and is chiefly intended to elucidate the fundamental principle of the invention;

Fig. 2 is a longitudinal section of a practical constructional form of the device.

showing the switch members in position to close a circuit.

Fig. 3 is a view similar to Fig. 2, showing the hand operated switch in closed position and the automatic switch in open position.

Fig. 4 is a similar view, showing the hand operated switch in open position and the automatic switch in closed position.

Fig. 5 a transverse section on the line $a$—$b$, Fig. 4, and

Fig. 6 a transverse section on the line $c$—$d$, Fig. 4.

In the example shown in Fig. 1 a hand operated resetting switch 1, i. e., a switch member capable of being opened and closed by hand, is provided and consists of a slide 1 which is displaceably guided on an inclined plane on the switch-frame, which is not shown in the drawing. Said slide possesses a handle 2 at its lower or rear end. At its upper end the slide 1 carries a contact 3 which is intended to co-operate with a contact 4 which is fixed on the switch-frame and is connected with the positive lead. Moreover three other contacts 5, $5^a$, 6 are arranged on the slide, of which the two first 5, $5^a$ are connected with the contact 3 while on the contact hand the other 6 is insulated from the contacts 3, 5 and $5^a$. When the hand operated switch is in its closed position, as shown in Fig. 1, the contact 6 makes contact with a contact 7 resiliently arranged on the switch-frame, which contact is connected with the negative lead of the switch. The contacts 5, $5^a$ and 6 form the fixed contacts of an automatic switch i. e., a switch released for opening movement by a current overload or thermally controlled releasing device, and which switch consists of a lever 8 pivotally mounted as at $8^a$ on the slide, on which lever a contact bridge-piece or contact brush 9 and an advance contact 10 are arranged. When the switch-lever 8 is in its closed position it connects the contact 7 with the contacts 5, $5^a$ and 3 so that by sliding switch 1 backward and forward to break or make connection between contacts 3 and 5 and 9 and $5^a$ the circuit can be opened and closed. The lever 8 of the automatic cut-out is subjected to the action of an opening spring 11. Said lever is usually held in its closed position by means of a bell-crank lever 13 engaging under a short arm 12 forming part of the lever 8, which bell-crank lever when the hand operated switch is in its inner closed position is opposite a bell-crank lever 14 mounted on the switch-frame, which bell-crank lever for its part can be turned by means of the armature of a coil 15 likewise arranged on the switch-frame. Finally on the switch-lever 8 there is arranged a specially curved projection 16 adapted, when the switch 8 is open and the switch is slid rearwardly to open position, to engage a stop, such as a roller 17, fixed on the switch-frame, whereby through such movement of the switch 1 the automatic switch 8 will be closed.

In the position of the parts drawn in full lines in Fig. 1 both the hand operated switch and also the automatic switch are closed and the circuit is consequently closed. If the circuit becomes overloaded the bell-crank levers 14, 13 are turned by the armature of the coil 15 in the direction to release the automatic switch, whereupon the latter is instantaneously opened by the spring 11, as indicated by the dot and dash lines in Fig. 1 and so disconnects the endangered circuit. In order to close the circuit again the hand operated switch also must first be opened in which operation the automatic switch 8 is closed by the projection 16 striking against the roller 17 and then closed. When the switches are thus closed to close the circuit the automatic switch is in position to be again controlled by the releasing coil 15 so that it can be opened again without delay, even at the moment at which the circuit is closed, if the latter is overloaded.

In the construction shown by way of example in Figs. 2 to 6 the hand operated switch slide $1^x$, which is guided vertically, is in general of a tubular shape and it contains a releasing device for the automatic switch, which releasing device comes into action both in direct consequence of overload and also of inadmissible heating. This releasing device consists of an electromagnet coil 26, which simultaneously serves as a heating coil and which, when the switch members are closed, is traversed by the working current, and a magnet armature 20 which is movable up and down in the central tube of said coil. The said armature is mounted at the upper end of a rod 19 which is guided in a sleeve 27 capable of up and down movement and which serves as striking rod for releasing that locking device of the automatic switch which is to be hereinafter described. The sleeve 27 on its part is guided and is capable of up and down movement in a fixed tube $27^a$, and said sleeve 27 is acted upon by a spring 18 pressing against a flange at the upper end of the sleeve and tending to hold the sleeve always in its highest position, as indicated in Figs. 2 and 4. The sleeve 27 is firmly soldered in this position in the tube $27^a$ by means of a soldering metal which softens at a predetermined temperature. Between the upper flange of the sleeve 27 and the magnet armature 20 is arranged another spring 21 which tends to hold the armature 20 in its highest position as illustrated in Figs. 2 and 4. The spring 21 is stronger than the spring 18, and is so dimensioned that the armature 20 can be drawn into the coil 26 against the spring 21 only when the current flowing through the coil is a multiple, about three times the strength of the steady current allowable for the circuit in series with the switch. On the other hand the spring 18 is so dimensioned that, after the softening of the solder which holds the sleeve 27, it can be compressed when the steady current is normal by the armature 20 when the same is drawn into the coil 26.

The above-described releasing device operates in a manner known per se by the armature 20, in the event of sudden overloads, e. g., short circuits, being drawn into the magnet coil 26, the powerful spring 21 being thereby compressed if there has been no preliminary softening of the soldered joint securing the sleeve 27. On the other hand, should there be overloading to a small extent but of long duration which results in the coil 26 being heated to the melting temperature of the solder which secures the sleeve 27, said sleeve is liberated, with the result that the armature 20 in its downward movement drives the sleeve 27 downwards by means of the spring 21 which remains in a substantially unstressed condition. Only the weaker spring 18 now, therefore, need be compressed, and as stated this spring is so dimensioned that to effect this compression by the armature 20 the normal steady current value will suffice.

The slide, in this case also, carries at the end opposite to the handle the contact 3 coacting with a contact 4 connected to the positive lead and arranged on the fixed insulating plate 24, as well as two other contacts 5ª, 5 which are electrically connected with the contact 3 by means of the bolt 22. For the contact 6 of the example according to Fig. 1 there is substituted an arrangement in which the lever 8 of the automatic switch is connected by means of a conductor (not shown) through the coil 26 with a contact bar 6ª arranged on the slide 1ˣ, which bar when the switch 1ˣ is closed makes contact with a resilient contact x which is connected with the main circuit and which is provided on the frame of the switch. The switch-lever 8 which is provided with a main contact 9 and an advance contact 10 produces when the switch is closed the electrical connection of the bar 6ª with the contact 3 of the hand operated switch so that the circuit can then be closed by closing the hand operated switch. The lever 8 is subjected to the action of two opening springs 11 and it is held or propped in its closed position by means of a pair of toggle-levers 23, which pair is so arranged that the releasing pin 19 causes it to collapse and consequently the switch lever to be released when a movement of said pin is brought about by the circuit becoming overloaded. For the purpose of closing the automatic switch again there is provided on the switch lever 8, as in Fig. 1, a specially curved projection 16 which coacts with a roller 17 which is supported on a lever 28 mounted on the insulating base 25 which can be adjusted by means of a set-screw 29.

The mode of operation of the device according to Figs. 2 to 6 is substantially the same as that of the device according to Fig. 1. In the position of the parts according to Fig. 2 the circuit is closed. If the releasing pin 19 in consequence of a short-circuit or of inadmissible heating of the circuit and of the coil 26, as hereinbefore described, is moved against the toggle-levers 23, the automatic switch is no longer locked and it is then opened by the springs 11 (Fig. 3). The hand operated switch must then also be opened (Fig. 4) by a downward movement, the automatic switch being closed again by the projection 16 coacting with the roller 17, after which the circuit can be closed again by moving the hand operated switch upwardly to closed position.

In order to be able to utilize the device according to Figs. 2 to 6 simultaneously as an instantaneous hand cut-out switch the following arrangement is provided. The hand operated switch contact 4 arranged on the insulating plate 24 is mounted on a sliding rod 30. It is subjected to the action of a feed-spring 31 which tends to press it against the contact 3. The movement of the rod 30 is so limited by the nut 32 that the contact 4 during the first portion of the movement of the switch 1ˣ in the direction in which it opens is permitted to follow the contact 3 but is prevented by the nut 32 from moving so far as the contacts in the switch opening movement, so that in the final portion of the switch opening movement the contacts 3 and 4 separate from one another. At the lower or handle end of the switch 1ˣ a transverse rod 33 is displaceably guided in said switch, which rod carries at its inner end a nose coacting with a striking-screw 34 on one of the members of the toggle lever 23 and at its outer end a wedge-shaped head 35. The latter is intended to coact with a pivoted normally horizontal lever 36 mounted on the insulating plate 25, which lever is held from tilting downwardly from a horizontal position by means of a pin 32ª but may tilt freely under pressure in an upward direction.

If the switch 1ˣ, while the automatic switch is closed, is moved downward to a predetermined degree the head 35 which passes through an opening in the plate 25, which opening is not illustrated in the drawing, comes against the lever 36, the result being that the rod 33 is shifted inwards, the consequence of which is that the toggle levers 23 are caused to collapse. The automatic switch is then instantaneously opened by the springs 11 before a separation of the contacts 3, 4 of the hand operated switch takes place. On the switch 1ˣ being moved further downward to a fully open position, the switch lever 8, is mechanically closed again. When the switch 1ˣ is shifted to closed position the transverse rod 33 and consequently the locking device of the automatic switch remain uninfluenced, since the striking-lever 36 tilts upwardly and out of the way of member 35 during this switch movement. The lever 28 carrying the roller 17 lies, when in normal working position, above the head 35. Upon swinging this lever 28 out of the path of head 35, the slide 1ˣ may be readily withdrawn from its seat opening in the switch panel, plate or baseboard 25, carrying with it all other working parts of the manually operable and automatic switches.

As is evident from the drawing the length of the lever 8 may be such that the automatic switch opens wide, so that the maintenance of an arc is rendered difficult. The arc is very quickly broken off from the fixed contacts 5, 5ª which are situated higher than the contacts 9, 10, this being effected by means of the upward current of air due to the heat, assisted by a magnetic blow-out. The fixed advance contact 5 of the automatic switch consists advantageously of two copper-coated carbons (see Fig. 5) which are under the action of a spring 37 and which are inclined to one another, while the advance contact 10 mounted on the lever 8 is wedge-shaped and is also in the form of a copper-coated carbon contact. Moreover the contact 3 of the hand operated switch also consists of copper-coated carbon. Since all of the contacts arranged on the slide are dead when the hand operated switch is open, the contacts can be examined and exchanged without the main isolation switch being opened.

What I claim is:—

1. An overload switch comprising a manually operable switch member movable to circuit making and breaking positions, an automatic switch member pivotally mounted for movement on the movable part of the manually operable switch member to close or open a gap in the conducting line of said manually operable switch member, means responsive to circuit overload conditions for shifting the automatic switch member to circuit opening position, and means lying in the path of the opened automatic switch and operative on a circuit breaking movement of the manually operable switch member when the automatic switch is in circuit opening position to restore it to circuit closing position.

2. An overload switch comprising a manually operable reciprocatory switch member movable backwardly and forwardly to circuit making and breaking positions, an automatic switch member pivotally mounted for movement on the movable part of the manually operable switch member to close or open a gap in the conducting line of said manually operable switch member, means responsive to circuit overload conditions for shifting the automatic switch member to circuit opening position, and means operative on a backward circuit breaking movement of the manually operable switch member when the automatic switch is in circuit opening position to restore it to circuit closing position.

3. An overload switch comprising a manually operable switch member movable to circuit making and breaking positions, an automatic switch member mounted for movement on the movable part of the manually operable switch member to close or open a gap in the conducting line of said manually operable switch member, means responsive to circuit overload conditions for shifting the automatic switch member to circuit opening position, and an abutment arranged to lie in the path of the opened automatic switch for engagement therewith when the manually operable switch member is moved to circuit breaking position for shifting the automatic switch member back to its circuit closing position.

4. In a switch mechanism, a manually operable switch movable to circuit making and breaking positions, an automatic switch mounted on the movable part of said manually operable switch and movable to circuit making and breaking positions and normally closing the circuit through said manually operable switch, and means operable by a circuit breaking movement of the manually operable switch for returning the automatic switch after a circuit breaking movement to normal position and placing said switches in condition for a circuit closing action by subsequent movement of the manually operable switch to circuit closing position.

5. In a switch mechanism, a sliding manually operable switch member movable to circuit making and breaking positions, a pivotally mounted automatic switch member mounted on the sliding switch member and movable to circuit making and breaking positions and normally closing the circuit through said sliding operable switch member, and means operable by a circuit breaking movement of the sliding switch member for returning the automatic switch after a circuit breaking movement to normal position and placing said switches in condition for a circuit closing action by subsequent movement of the sliding switch member to circuit closing position.

6. An overload switch comprising a reciprocatory manually operable switch member, a pivotally mounted automatically operable switch member carried by the manually operable switch member, and a heat responsive locking and releasing means for the automatic switch member.

7. An overload switch comprising a reciprocatory manually operable switch member, a pivotally mounted automatically operable switch member carried by the manually operable switch member, a heat responsive locking and releasing means for the automatic switch member, and means lying in the path of the automatic switch member when opened and operative upon a circuit opening movement of the manually operable switch member for returning said automatically operable switch member to its locked circuit closing position.

8. An overload switch comprising a reciprocatory manually operable switch member, a pivotally mounted automatically operable switch member, a lever locking means for holding the automatically operable switch member normally in closed position, heat responsive means governing said lever locking means for a switch releasing action, and means operable upon a circuit opening movement of the manually operable switch member for closing and locking said automatically operable switch member.

9. An overload switch comprising a reciprocable manually operable switch member, a pivotally mounted automatically operable switch member, spring means for moving the electrically operable switch member to circuit opening position, a locking lever mechanism for locking the automatically operable switch member in circuit closing position, means responsive to circuit overload conditions for releasing said lever locking mechanism, and means arranged in the path of the open automatic switch member, when the manually operable switch member is moved to circuit opening position, for returning said automatically operable switch member to locked circuit closing position.

10. An overload switch comprising a manually operable switch member having a gap, an automatically operable switch member for closing or opening the gap in the manually operable switch member, and combined electromagnetic and thermoelectrical means responsive to electrical circuit conditions for governing said automatically operable switch member.

11. An overload switch comprising a manually operable switch member having a gap, an automatically operable switch member for closing or opening the gap in the manually operable switch member, and means responsive to circuit conditions for opening said automatically operable switch member, said means comprising a thermo-electromagnetic coil, and electro-mechanical switch opening means responsive to electrical or thermal influences of the coil.

12. Devices according to claim 1, characterized by the movable part of the manually operable switch member being slidably guided so as to be capable of reciprocating, and capable, after undoing a part limiting its opening movement, of being withdrawn from its guide together with the automatic switch as a whole.

13. Device according to claim 1, including means for closing the automatic switch consisting of a lever (28) which is provided with a roller (17) and is revolubly mounted on the switch-frame, which lever in its operative position is supported by a set-screw (29) and can be rotated out of its operative position for the purpose of completely withdrawing the hand switch from its guide.

14. Device according to claim 1 including a locking device for the automatic switch and a releasing device for the locking device enclosed in the manually operable switch.

15. Device according to claim 1, including a locking device for the automatic switch consisting of a toggle-lever (23) which is normally extended, an armature (19, 20) for collapsing said toggle lever, and an electromagnet coil controlling said armature.

16. Device according to claim 1, characterized by one of the contacts of the hand switch being spring pressed in the direction of motion of the switch against the other coacting contact so that the mutual separation of the contacts of the hand switch does not take place until after the switch has completed a portion of its opening movement, and by a mechanical releasing device (33, 34, 36) for the locking device of the automatic switch, which device is mounted in part on the switch and in part on the switch-frame or the like, being so arranged that the automatic switch on the hand switch being opened is released before the aforesaid contacts of the hand switch separate from one another.

17. Device according to claim 1, characterized by the hand switch embodying a slide (1×), a toggle lever, and a rod (33) coacting with a striking-lever (36) supported on the fixed guide for the slide, by means of which rod the toggle-lever (23) can be caused to collapse (Figs. 2 to 6).

18. Device according to claim 1, characterized by a slide (1×) of the hand switch being mounted on a switchboard (25) having an opening therein and being so guided in said opening as to be capable of being displaced transversely with regard to the plane of the board.

In testimony whereof I affix my signature.

OTTO DREYER.